United States Patent [19]

Sarugaku et al.

[11] Patent Number: 4,633,059
[45] Date of Patent: Dec. 30, 1986

[54] METHOD AND APPARATUS FOR WELDING LINE TRACER CONTROL

[75] Inventors: Shinichi Sarugaku, Narashino; Masao Tsuji, Funabashi, both of Japan

[73] Assignees: Hitachi, Ltd, Tokyo; Hitachi Keiyo Engineering Co., Ltd., Narashino, both of Japan

[21] Appl. No.: 678,285

[22] Filed: Dec. 5, 1984

[30] Foreign Application Priority Data

Dec. 9, 1983 [JP] Japan .................................. 58-231332

[51] Int. Cl.⁴ ................................................ B23K 9/12
[52] U.S. Cl. ........................... 219/124.22; 219/124.34; 219/125.12; 901/42
[58] Field of Search ...................... 219/124.34, 125.12, 219/124.22, 125.1; 901/42

[56] References Cited

U.S. PATENT DOCUMENTS

| 4,255,643 | 3/1981 | Balfanz | 219/125.1 |
| 4,448,342 | 5/1984 | Abe et al. | 219/124.34 |
| 4,508,953 | 4/1985 | Murakami et al. | 219/125.12 |

FOREIGN PATENT DOCUMENTS

| 76498 | 4/1983 | European Pat. Off. | 219/125.1 |
| 58-145370 | 8/1983 | Japan | 219/124.22 |

Primary Examiner—Clifford C. Shaw
Attorney, Agent, or Firm—Beall Law Offices

[57] ABSTRACT

A relative weaving motion of a welding torch relative to a weld line is given to a welding torch, by way of composing a weld main path vector for a relative movement of the weld torch along the weld line and a swing vector for a relative movement of the weld torch. And by detecting the amount of an electrical parameter of an arc of the weld torch, the amount of correction is calculated based upon the deviation between the detected amount and a predetermined reference amount. The direction of the amount of correction is determined based upon the swing vector. The relative movement of the weld torch relative to the weld line is performed by a vector composed of the weld main path vector, the swing vector, and the correction vector. In other words, the present invention features the direction of the amount of correction being definitely determined based upon the basis of the swing vector.

18 Claims, 18 Drawing Figures

MISSING PAGE TEMPORARY NOTICE

PATENT # 4633059 FOR ISSUE DATE 12-30-1986 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 3

METHOD AND APPARATUS FOR WELDING LINE TRACER CONTROL

The present invention relates to a method and apparatus for controlling a torch position in butt welding or fillet welding using a groove, in which the welding torch is being weaved and the arc current or voltage supplied to the welding torch, that is, the amount of electricity corresponding to the arc, is detected.

Control of tracing a weld line is already known in the art, in which while weaving a welding torch, the arc current flowing through the welding torch is detected so the position of the welding torch does not to go away from a preset weld line.

One of those methods for controlling a weld line tracing according to the prior art is to control the position of a welding torch based upon the results obtained by comparison of the detected value of an arc current with a predetermined constant reference value. For example, it is a method to control the position of a welding torch based upon the results obtained by comparison of the value of arc current detected in association with a center of a weaving pattern, with a corresponding constant reference value.

Another of those methods is to control the position of the torch based upon results obtained by comparing the detected values at both ends of a weaving pattern, using either one of the values as a reference value. This method utilizes a phenomenon that occurs, for example, when the path of a welding torch runs off a weld line along a groove either to the right or left side, and the arc current at one of the right and left sides in the weaving pattern becomes larger than that at the other side.

The above physical motion of a welding torch is attained by using an industrial robot. That is, the motion can be realized by attaching a welding torch at a tip of a wrist of the industrial robot. Information necessary for the welding torch attached at the tip of the wrist, is stored as a program in a storage device provided in a control device of the robot, by incorporating a teaching method or the like. The control device then reads out the program stored in the storage device in a regeneration mode of the program, and based upon the program information read, the robot is actuated to move the welding torch along a predetermined moving path. At the same time, by detecting the amount of an electrical parameter of the arc and based upon the detected amount of the electrical parameter, the control device functions to correct a position deviation relative to the weld line for the welding torch.

For the correction of the position deviation of the welding torch relative to the weld line, the amount of deviation, that is, the amount of correction, can be calculated relatively with ease by detecting the amount of electricity corresponding to the arc. In order to correctly move the welding torch in accordance with the amount of correction, however, the direction of correction together with the amount of correction must be utilized. That is, it is necessary to determine to which direction the welding torch must be moved by the amount corresponding to that of correction. To determine the direction of correction, the direction of correction has conventionally been determined by recognizing the actual position of a welding torch. As well known in the art, the industrial robot has many shafts, and with a rotational combination of these shafts, a welding torch attached to the wrist is moved along a desired path. Therefore, in order to recognize a present position of the welding torch, position information on each shaft is retrieved and, from that information a mathematical calculation is performed. The mathematical calculation is substantially carried out mainly by an arithmetic and logical processing unit provided in the control device, e.g., a microprocessor. The calculation, however, is very complicated and it takes a lot of processing time.

To move the welding torch in accordance with the program stored in the storage device in the control device, a fairly large volume of calculations processings are required, and most of the processing time in the arithmetic and logical processing unit is consumed while performing such calculations under present conditions. More in particular, in order to smoothly move the welding torch attached to the wrist, the control device must sequentially output position information on the next advance of the welding torch at very short time intervals. Therefore, performing calculation of the movement in accordance with the program within that short time period, and in addition, executing mathematical process for the present position and correction direction of the welding torch aimed at correcting the position deviation of the welding torch, are very difficult. In particular, for an articulation type robot having a number of shafts, a fairly long operational time is required for calculating the present position of a welding torch and it can be said that it is substantially impossible. Thus, the weld line tracing control described above has not been practiced as things now stand.

The present invention has been made in view of the above problems, and it is an object of the present invention to provide a method and apparatus for controlling tracing of a weld line wherein the direction of correction for a welding torch relative to a weld line can be definitely determined and the time required for correction can be shortened.

In order to attain the above objects, according to the present invention, weaving motion relative to a weld line is imparted to a welding torch, by way of composing a weld main path vector for a relative movement of the weld torch along the weld line and a swing vector for a relative movement of the weld torch. By detecting the amount of an electrical parameter an arc of the weld torch, the amount of correction is calculated based upon the deviation between the detected amount and a predetermined reference amount. The direction of the amount of correction is determined based upon the swing vector. The movement of the weld torch relative to the weld line is performed by a vector composed of the weld main path vector, the swing vector, and the correction vector. In other words, the feature of the present invention is that the direction of the amount of correction is definitely determined based upon the swing vector.

According to a preferred embodiment of the present invention, the correction vector is directed perpendicular to the swing vector.

According to a structure of the apparatus of the present invention, a moving mechanism is provided for giving the welding torch a relative movement along a desired path relative to the weld line. According to a preferred embodiment, the moving mechanism is an industrial robot. And storage means is provided for storing weld main path vector information for a relative movement of the welding torch along the weld line, and swing vector information for a swing movement of the welding torch relative to the weld line is provided. Further, detection means and correction amount calculating means are provided respectively for detecting the amount of an electrical parameter of an arc of the welding torch and for calculating the amount of correction based upon the deviation between the detected amount and a predetermined reference amount. And correction vector forming means is provided for obtaining a vector by imparting a direction determined by the swing vector information to the amount of correction. The swing vector referred to while forming the correction vector may be the swing vector information stored in the storage means, however if the information varies with time and the weld main path vector information, the swing vector may preferably be the varied information. For the structure of the apparatus, there is further provided control means for controlling movement of the moving mechanism so as to give the welding torch a relative movement along the weld line, in accordance with a vector composed of the weld main path vector information, swing vector information, and correction vector information.

In a preferred embodiment, the correction amount calculating means, correction vector information forming means, and control means may be embodied by a processing unit such as a digital computer, or more preferably by software using a microcomputer or the like. Thus, the storage device of the microcomputer may be stored with a program for realizing such software. It is obvious that since it is difficult to apply the output from such a microcomputer directly to the moving mechanism, the control means includes an appropriate interface section.

The accompanying drawings show one embodiment according to the present invention: wherein

FIG. 5 is a flow chart illustrating a whole processing operation;

Referring now to the accompanying drawings, one embodiment according to the present invention will be described. In the present embodiment of an automatic welding apparatus, a multi-articulation type robot 1 (hereinafter abbreviated simply as robot) of a manipulator provided with a microcomputer in a control section, has been provided.

Figure 1:
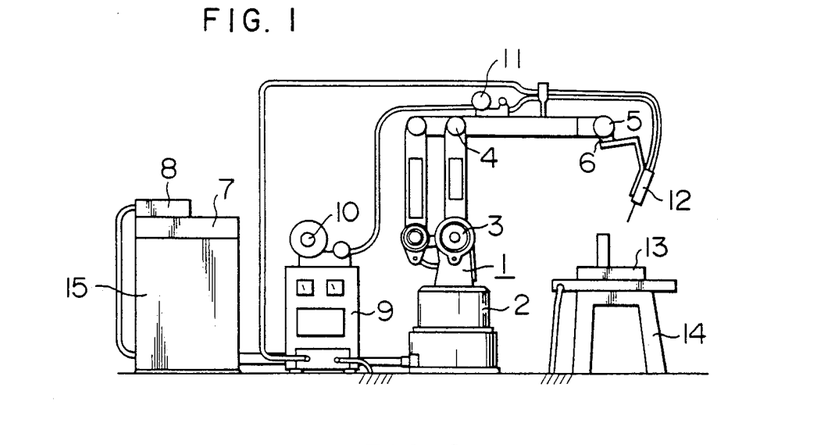
FIG. 1 is a schematic view showing an overall automatic welding apparatus.
Figure 2:
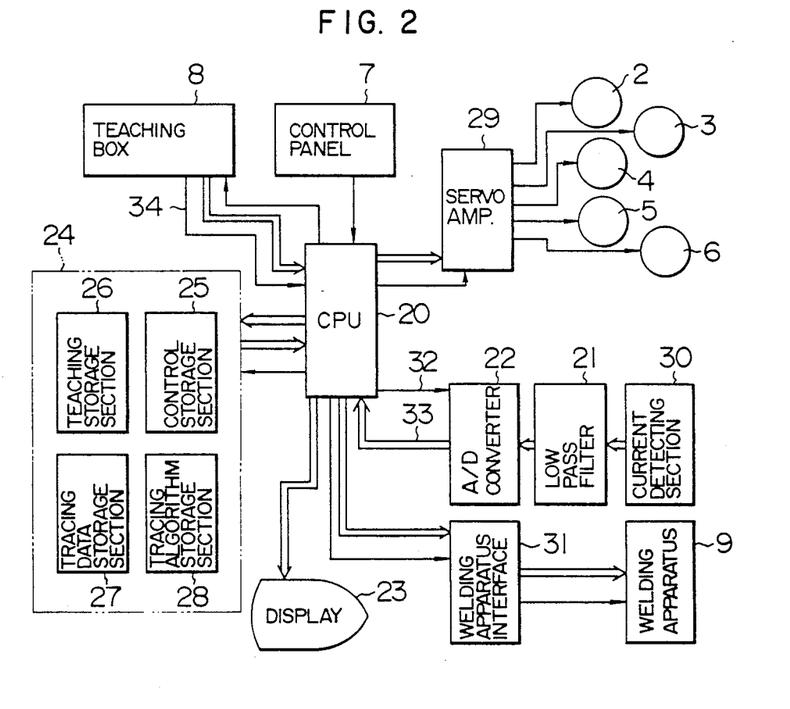
FIG. 2 is a block diagram showing an overall control system.

FIG. 1 shows a whole arrangement of the present embodiment. A robot generally represented by reference number 1 comprises a pivot shaft 2, upper arm shaft 3, lower arm shaft 4, bend shaft 5, and twist shaft 6, each shaft being driven by a suitable servo motor. Reference number 7 denotes a control panel for the robot 1, which is provided with a number of key switches not shown so as to turn on or off a power source, change over modes for the robot 1 described later, and the like. Reference number 8 denotes a teaching box provided with a number of key switches for teaching the movement of the robot 1. Reference number 9 denotes a welding apparatus, which as will be described later, supplies weld current and voltage in accordance with a command from a control device 15 of the robot 1. Reference number 10 denotes a wire supplying device, which supplies a wire wound about a roller in accordance with a command from the welding apparatus. Reference number 11 denotes a wire feeding device, which delivers a wire from the wire supplying device 10 to the top of a torch. Reference number 12 denotes a welding torch. In addition, a shield gas supply device is provided although it is not shown in the figure. Reference number 13 denotes an object to be welded (hereinafter called a work). Reference number 14 denotes a base for fixing the work 13, the base being electrically grounded. Reference number 15 denotes a control device for controlling the whole parts of the system, an internal arrangement of which and a relation to external devices are shown in FIG. 2.

The description will now be made with respect to FIG. 2. Reference numbers 2, 3, ..., 9 denote external devices which correspond to those represented by identical numbers in FIG. 1. Reference numbers 20, 21, 22, 24, 25, ... 28, and 31 through 33 denote internal devices of the control device 15 shown in FIG. 1. Reference number 23 denotes a display device for notifying an operator about various states of the robot 1. Reference number 20 denotes a central processing unit (hereinafter merely referred to as CPU), which controls the whole system in compliance with data in the storage device 24 in response to a command from the control panel, such as mode change-over command, starting command, and the like. Reference number 29 denotes a servo amplifier section, which in response to a command from the CPU 20 drives respective servo motors 2, 3, 4, 5, and 6 to rotate the corresponding shafts. Reference number 30 denotes a current detection section contained in the welding apparatus 9, which converts the welding current into a corresponding small voltage signal. Reference number 21 denotes a low pass filter which removes noise components from a voltage signal of the output from a current detection section 30. Reference number 22 denotes an analog to digital converter, which converts a voltage signal from the low pass filter 21 into a digital signal readable by the CPU 20. The timings of the conversion are instructed via a control line 32 from the CPU 20. It is noted here that a single line such as identified by reference number 32 in FIG. 2 represents a control line and that a bold arrow composed of two lines represents a data line through which data is transmitted. Reference number 31 denotes an interface for the welding apparatus, which converts a command from the CPU 20 or data transmitted from the CPU 20 into a command for the welding apparatus 9. Reference number 24 denotes a storage device which is divided interiorly thereof into several areas, and has storage sections 25, 26, 27 and 28: The storage section 25 is a control storage section where a starting program for the CPU 20, a unit movement program for the robot 1, and a basic processing program in each mode are stored. This in particular means that, for example, if a teaching mode is selected with the control panel, the CPU 20, under the basic processing program in the storage section 25, actuates a certain shaft of the robot 1 appointed with the teaching box. Moreover, concurrently therewith, upon delivery of a teaching command via a control line 34 from the teaching box 8, the CPU 20 operates to store into the teaching storage section 26, in accordance with the basic processing program in the storage section 25, the position information of the robot 1 and the operation conditions set by the teaching box 8, at that time. The control storage section 25 is made of ROM's, while the storage section 26 is made of non-volatile RAM's.

After a working mode is appointed through the control panel 7 and after a start switch (not shown) on the control panel 7 is depressed, then in accordance with the basic processing in the control storage section 25 and in compliance with the sequence of the working mode, the CPU 20 operates to re-trace the teaching movement, by using the teaching contents and the unit movement program for the robot in the control storage section 25. Reference number 28 denotes a tracing algorithm which constitutes a main part of the present invention. In the working mode in which welding is being carried out and the tracing appointment has been made by teaching data, the program stored in the storage section 28 is executed under control of the CPU 20. Reference number 27 denotes a tracing data storage section which stores data in association with the execution of the program in the storage section 28.

Figure 3:
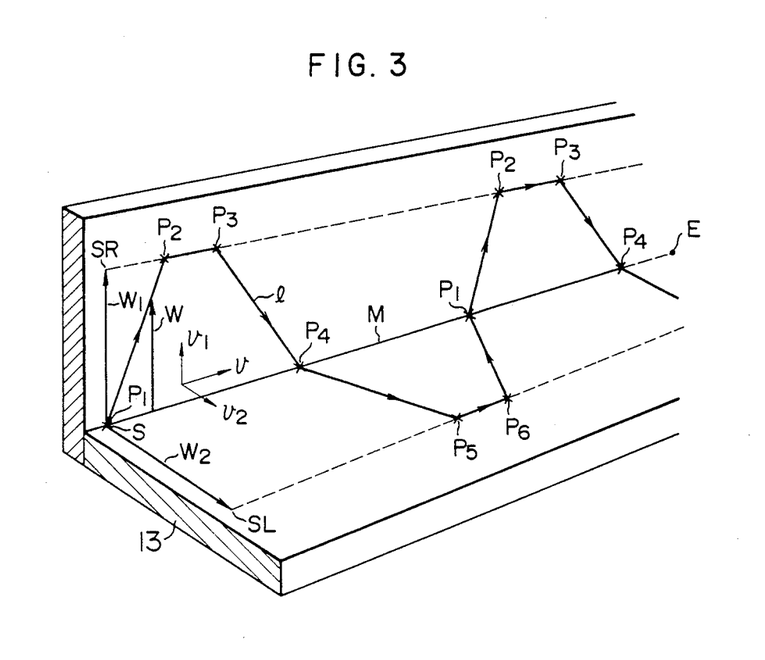
FIG. 3 is a perspective view for explaining a weaving operation.
Figure 4:
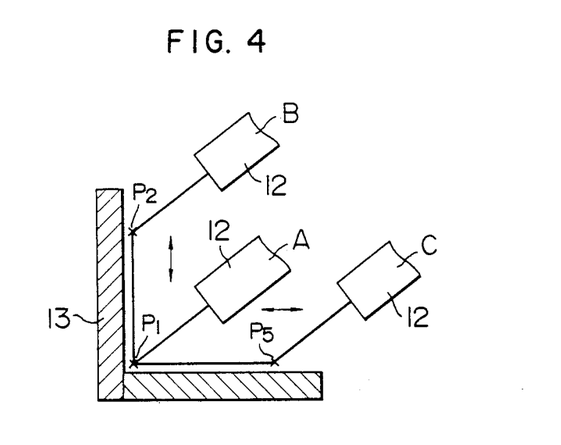
FIG. 4 is a right side view of FIG. 3.

Next, an example of weaving adopted in the present embodiment will be described. Weaving operation in automatic welding is roughly divided into two kinds. A first one is a method for weaving with the help of a driving portion which is exclusively provided for giving a weaving operation. A second one is a method, as is in the present embodiment, for weaving in operative combination with each shaft of a mechanism having three to six degrees of freedom. In FIGS. 3 and 4, an example of a weaving pattern is shown. The second method, when compared with the first one, can in general follow a number of weaving patterns whereby enabling welding with a technique more similar to that attributable to a skilled workman. In the present embodiment, a complicated patterned weaving is carried out by a robot 1 with five degrees of freedom by using weaving sub-routines in the robot unit movement program.

FIGS. 3 and 4 show illustratively weaving in the present embodiment. In FIG. 4, the welding torch 12 performs a reciprocal movement A→B→A→C→A between three points of positions A, B, and C. FIG. 3 shows a composite movement of the above reciprocal movement and a movement in a weld main path direction. In order to realize such movement, in a teaching mode, the following points, for example, are taught. First, these are a starting point S and a finish point E of the weld main path M. These points are taught in order to know the main path M. SR and SL are auxiliary points used for indicating the direction of reciprocal movement, the auxiliary points being taught in order to recognize vectors $W_1$ and $W_2$ indicative of the direction and magnitude of reciprocal movement. Further, the speed v of the welding torch on the main path M, and the speeds $v_1$ and $v_2$ in the swing direction are taught. With information related to these points, a desired weaving can be attained. In FIG. 3, one period of a weaving waveform is divided into six phases with are defined in the following.

First phase: movement in the $W_1$ direction at the speed $v_1$. In this case, since there is a similar movement in the weld main path direction v, the resultant locus becomes $P_1$ to $P_2$ as shown in FIG. 3. When the position W in the $W_1$ direction reaches a position $W_1$, then a next phase follows. The first phase can be represented by $(W = W_1/|W_1| \times \int v_1 dt)$.

Second phase: movement in the v direction for a certain time period at a swing direction speed o. This phase can be represented by $(W = W_1)$.

Third phase: movement in the $-W_1$ direction at the speed $v_1$. At a position $W = o$, the next phase follows. The third phase can be represented by $(W = W_1 - W_1/|W_1| \times \int v_1 dt)$.

The fourth, fifth, and sixth phases have respectively similar movements to those in the first, second, and three phases, in the $W_2$ direction and at the speed $v_2$.

Next, the procedure in a working mode will be described with reference to the flow chart shown in FIG. 5. In this embodiment, a continuous path control is realized by supplying position data to a servo system at every constant period (sampling time). Although it is not shown in the figure, the robot itself always has data representing its present position. First, in response to a starting command, the program is executed beginning with step 1. In step 2, a judgement whether the robot is at a teaching point or not is made. If the robot is located at the teaching point, the data representing the next move to a teaching point is read out of the teaching storage section 26. In step 4, in case that it is judged that the data for the next teaching point is not stored, then the starting operation is judged to be terminated and the process continues under the control of the superior program. In step 4, if the termination is not judged, the next step follows. In the case that the judgement for the teaching point is negative in step 2 and the judgement for the finish point is negative in step 4, then a vector $e_v$ in the direction of movement is calculated in step 5. The vector is calculated with the present teaching point $T_c$ and the previous teaching point $T_b$ by using:

$$e_v = (T_c - T_B)/|T_c - T_B|$$

In the following step 6, a processing of $$v = v_t \times e_v$$

is performed by using a designated speed $v_t$. Next, in step 7, a judgement whether there is a weaving command is made. And in the case of the presence of the weaving command, the processes of steps 8 and 9 are performed, and in the other cases, the process in step 12 is performed. In step 8 where there is a weaving command, a weaving vector is calculated. This processing is performed for each phase of the weaving waveform described above. The calculated vectors are:

$$\Delta W = (W_1/|W_1|) \times \Delta v_1 \quad \text{in phase 1}$$

($\Delta v_1$ represents a weaving speed using the sampling time as a unit speed)

$$W = o \quad \text{in phase 2}$$

$$\Delta W = -(W_1/|W_1|) \times \Delta v_1 \quad \text{in phase 3}$$

$$\Delta W = (W_2/|W_2|) \times \Delta v_2 \quad \text{in phase 4}$$

($\Delta v_2$ represents a weaving speed using the sampling time as a unit speed)

$$\Delta = o \quad \text{in phase 5}$$

$$\Delta W = -(W_2/|W_2|) \times \Delta v_2 \quad \text{in phase 6.}$$

In step 9, a calculation is carried out for $$W = W + \Delta W$$

wherein W is used for judgement of the transfer of each phase. In step 10, whether there is a tracing command or not is judged, and if affirmative, the process of the next step 11 is performed.

Figures 11, 12:
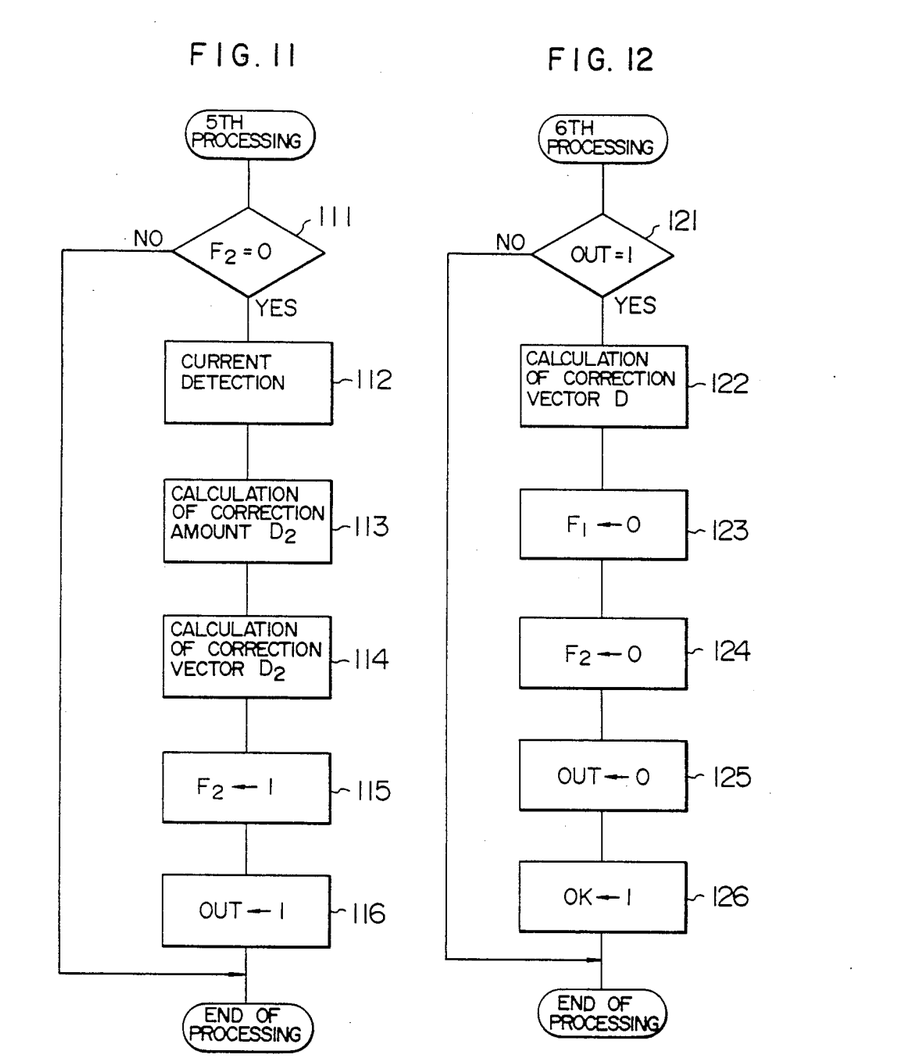

Calculation of the next interpolation point is carried out in step 12 in accordance with the following equation:

$$P_N = P_c + v + W + D \times oK$$

wherein
Pc: the present position vector of the robot
v: speed vector in the direction of movement (calculated from a number of teaching points and speed teaching data)
W: weaving position vector
D: tracing vector (described later)
$P_n$: next interpolation point
oK: output flag The output flag oK is set during the tracing process described later (step 126 in the sixth processing routine shown in FIG. 12) and made clear (OK←o) after calculation of the interpolation point. In step 13, the calculated interpolation point $P_n$ is converted into a rotary angle of each shaft of the robot. Thereafter, in step 14 output timing is adjusted in order to deliver an actual output to the servo motor in step 15. After completion of processing in step 15, the process is again returned to step 2 to thereby repeat the above processes.

Figure 6:
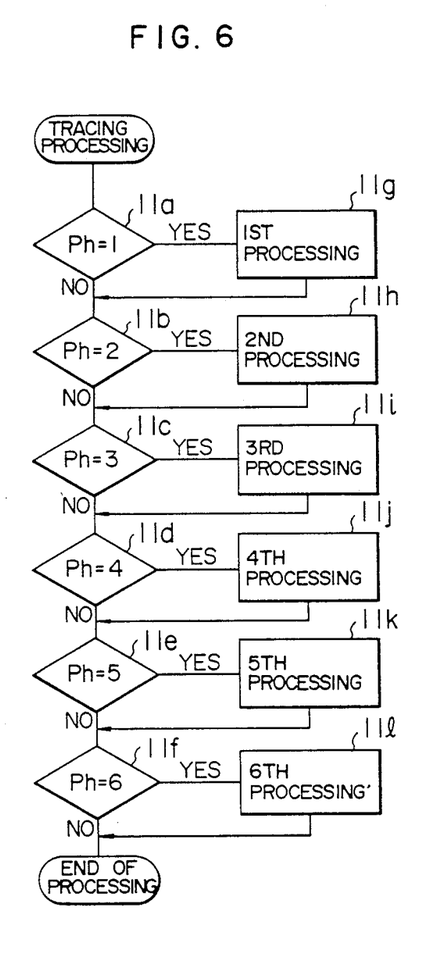
FIG. 6 is a flow chart illustrating a tracing processing operation.
Figure 7:
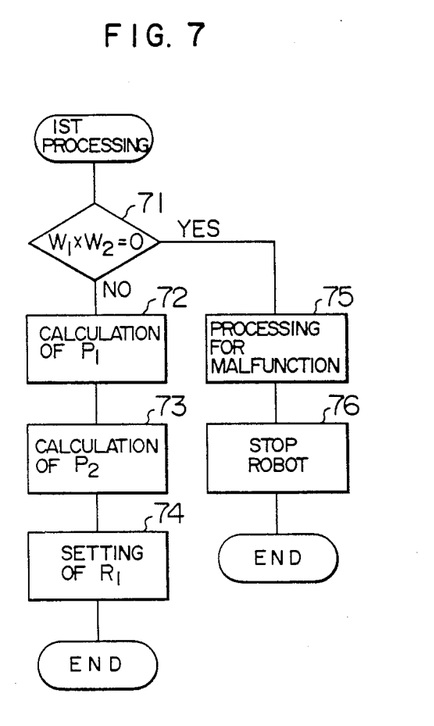
FIGS. 7, 8, 9, 10, 11, and 12 are flow charts respectively illustrating the first through sixth processing operations respectively.

FIG. 6 is a flow chart showing the process of a judgement section in the tracing process shown as step 11 in FIG. 5. $P_h$ represents a weaving phase described previously, and in each step 11a, 11b, 11c, ..., 11f whether there should be a corresponding step or not is judged. In response to the judgement result, the processing for each phase is independently carried out in each processing routine 11g, 11h, 11i, ..., 11l. Next, each processing routines 11h, 11i, ..., 11l will be described. FIG. 7 is a flow chart showing in detail the process in step 11g. $W_1$ and $W_2$ are first and second swing vectors for realizing the above mentioned weaving operation. In step 71, the conditions of the vectors $W_1$ and $W_2$ are judged. That is, if the angle between the vectors $W_1$ and $W_2$ is 0 or 180 degrees where both vectors are in parallel relation with each other, it is decided that a malfunction exists and a malfunction processing system follows in steps 75 and 76 to stop the robot. $P_1$ in step 72 represents a correction vector associated with the $W_1$ direction, while $P_2$ in step 73 represents one associated with the $W_2$ direction. $P_1$ and $P_2$ in step 72 and 73 are derived in the following way.

Conditions (x represents vector product and represents scalar product):

$$P1 = 1, P_2 = 1 \tag{1}$$

$$P_1, W_1, P_2 W_2 \tag{2}$$

$$P_1 \cdot (W_1 \times W_2) = 0 \tag{3}$$

$$P_2 \cdot (W_1 \times W_2) = 0 \tag{4}$$

$$P_1 \cdot W_2 \geq 0 \tag{5}$$

$$P_2 \cdot W_2 \geq 0 \tag{6}$$

Figure 13:
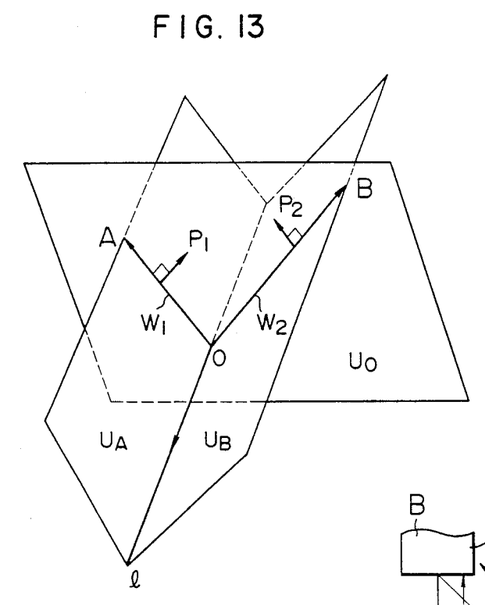
FIGS. 13, 14, 15, 16, 17, and 18 are views for explaining the present invention.

Each formula has the following meaning: $P_1$ and $P_2$ in the formula (1) are unit vectors. The formula (2), as shown in FIG. 3, means that $P_1$ and $W_1$, $P_2$ and $W_2$ are respectively perpendicular to each other. The formulas (3) and (4) mean that the vectors $P_1$ and $P_2$ both exist on a plane $U_o$ defined by the vectors $W_1$ and $W_2$ as shown in FIG. 13. The formulas (5) and (6) mean that the vectors $P_1$ and $P_2$ are directed to the smaller angle formed by the vectors $W_1$ and $W_2$. By using the formulas (1) to (6), $P_1$ and $P_2$ become:

$$P_1 = k_1 \cdot (W_2 - S/|W_1|^2 \times W_1) \tag{7}$$

$$P_2 = k_2 \cdot (W_1 - S/|W_2|^2 \times W_1) \tag{8}$$

wherein S, $k_1$, and $k_2$ are:

$$S = |W_1|^2 \cdot |W_2|^2 - (W_1 \cdot W_2)^2 \tag{9}$$

$$k_1 = (|W_1|^2/S)^{\frac{1}{2}} \tag{10}$$

$$k_2 = (|W_2|^2/S)^{\frac{1}{2}} \tag{11}$$

In the following step 74, a reference value $R_1$ of welding current in the phase 1 of weaving is calculated by a present welding current value. The above process is the first processing routine 11g.

Figure 8:
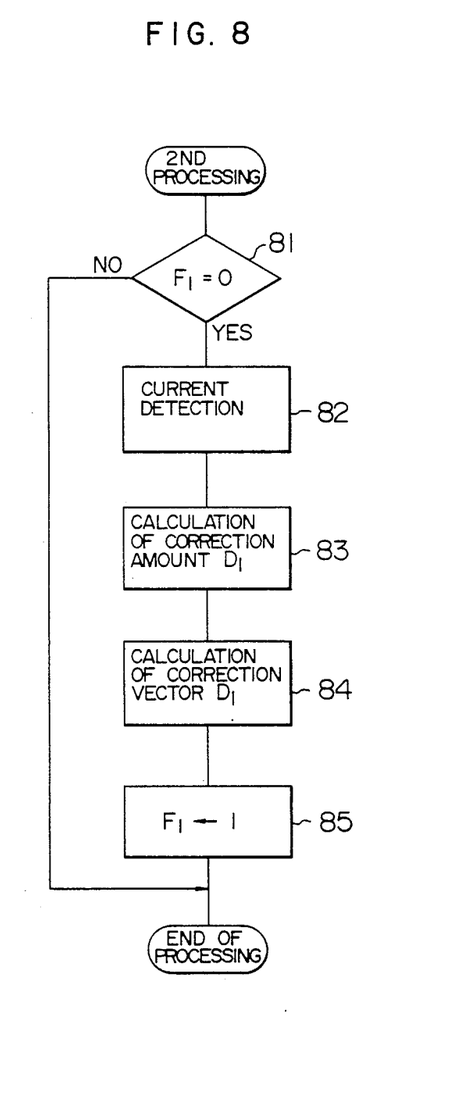

Next, the second processing routine 11h will be described. The flow chart is shown in FIG. 8. The judgement $F_1$ in step 81 prevents the succeeding processes from being repetitively carried out in the same weaving period, in cooperation with the process in step 85. In step 82, an actual welding current $I_1$ is detected. In step 83, the correction amount $D_1$ is determined by the following formula.

$$D_1 = G \times (I_1 - R_1) \tag{12}$$

(here, G represents a conversion constant)

In step 84, by using the vector $P_1$ obtained in step 72 of the first processing, routine the correction amount is changed into a vector as:

$$D_1 = D_1 \times P_1 \tag{13}$$

Figure 9:
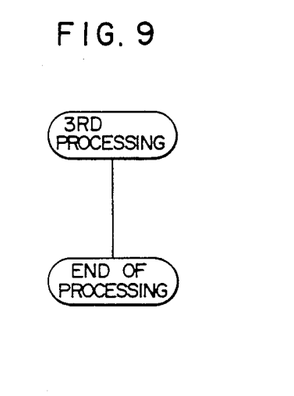
Figure 10:
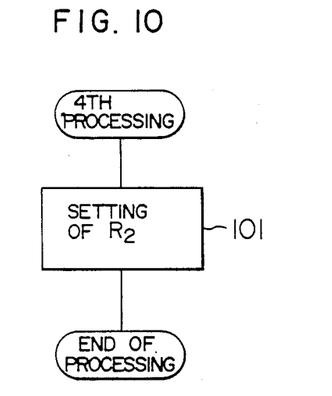

In the third processing routine, nothing is performed as is shown in FIG. 9. In the fourth processing routine, which is similar to the setting of $R_1$ in the first processing routine, the setting of $R_2$ the reference value of welding current in phase 4 of weaving is carried out in step 101 as shown in FIG. 10. In the fifth processing routine, almost the same steps as in the second processing routine are carried out with respect to the second direction, as shown in FIG. 11. However, as shown in step 116 in FIG. 11, a flag OUT is set with urges movement to the sixth processing routine. In the sixth processing routine, with the flag OUT shown in FIG. 12, steps 121 and 125 prevent the same processing routine from being performed repetitively in the same weaving period. In step 122, by using the vectors $D_1$ and $D_2$ obtained in the second and fifth processing routines, the total amount of correction is calculated as:

$$D = D_1 + D_2 \tag{14}$$

Then in step 126, the output termination flag OK is set and an interpolation calculation section in the main processing section shown in FIG. 5 is instructed to add the vector D. Steps 123 and 124 urge the second and fifth processing routines in the succeedingly weaving period.

Next, the principle of tracing will be described with reference to FIGS. 14 and 15. If a welding power source of a constant voltage characteristic is used, the extension has a certain constant relation to the flowing welding current. Generally this relation can be shown over a certain range by the following approximate formula:

$$I = -a \cdot L + b \quad (15)$$

(wherein $a > 0$ and $b > 0$).

Figure 14:
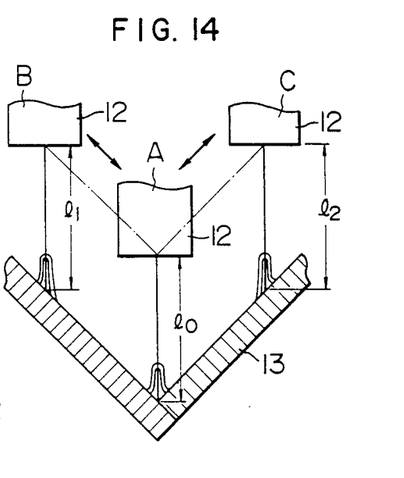

It is here assumed that as shown in FIG. 14, the welding torch 12 is correctly directed to a groove. With this assumption, the current values $R_1$ and $R_2$ respectively associated with the distances $l_1$ and $l_2$, are compared with the current values at the B and C sides. Then, $$D_1 = G \cdot (I_1 - R_1) = G \cdot \{(-a \cdot l_1 + b) - (-a \cdot l_1 + b)\} = 0 \quad (16)$$

and similarly, $$D_2 = 0 \quad (17)$$

therefore, it follows $$D = P_1 \cdot D_1 + P_2 \cdot D_2 = 0 \quad (18)$$

so that the correction operation is not executed. Next, it is assumed as shown in FIG. 15, the work 13 is moved by x to the left. In this case, since $l'_1 > l_1$ and $l'_2 < l_2$, thus:

$$D_1 = G \cdot (I'_1 - R_1) = G \cdot \{(-a \cdot l'_1 + b) - (-a \cdot l_3 + b)\} = -G \cdot a \cdot (l'_1 - l_1) \quad (19)$$

similarly $$D_2 = G \cdot a \cdot (l'_2 - l_2) \quad (20)$$

Therefore, $$D_1 = -G \cdot a (l'_1 - l_1) \quad (21)$$

$$D_2 = G \cdot a (l'_2 - l_2) \quad (22)$$

$$D = D_1 + D_2 \quad (23)$$

Figure 15:
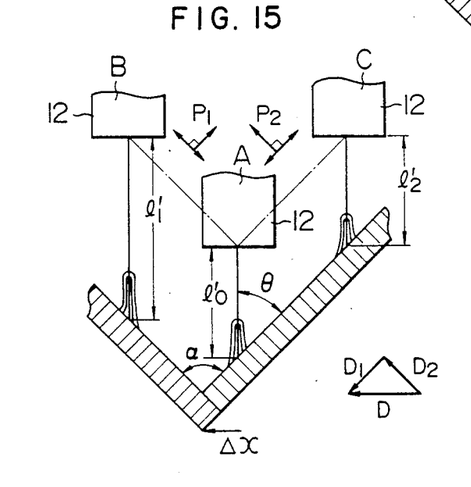

And $D_1$, $D_2$, and D are related to each other as shown in FIG. 15. As a result, if the constant G is determined in compliance with $$\Delta x = |D| \quad (24)$$

then a correct tracing control may be attained. For example, in FIG. 15, assuming $\alpha = 90°$, and $\theta = 45°$, then $$\Delta x = (l'_1 - l_1) = -(l'_2 - l_2) \quad (25)$$

also $$D = |1/\sqrt{2}D_1| + |1/\sqrt{2}D_2| \quad (26)$$

therefore, $$D = G \cdot a \cdot \Delta x \times 1/\sqrt{2} \times 2 = \sqrt{2} G \cdot a \cdot \Delta x \quad (27)$$

Here taking $\Delta x = D$, the constant becomes:

$$G = 1/\sqrt{2}a \quad (28)$$

In general, by solving the formulas (24) to (28) using particular values of $\theta$ and $\alpha$, the constant G is determined.

As appreciated in the above description, it is possible to effect a tracing control over an ordinary deviation.

Figure 16:
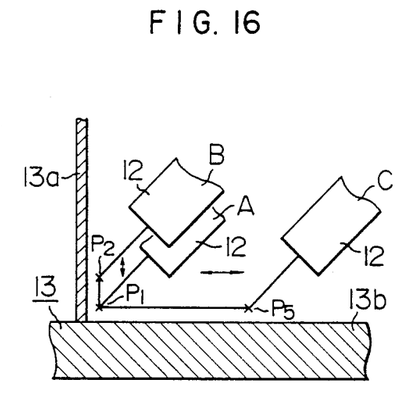

FIG. 16 schematically shows one practical example of tracing. In the figure, reference 13a denotes a thin plate and reference 13b denotes a thick plate. In the prior art, a joint by welding between such thin and thick plates has required advanced technique, welding merely employing a single oscillatory weaving has been difficult to perform, and furthermore, to effect a tracing has been far more difficult. However, in the present embodiment, a tracing can be effected by using a weaving as shown in the figure so that a sufficient weld can be attained.

Figure 17:
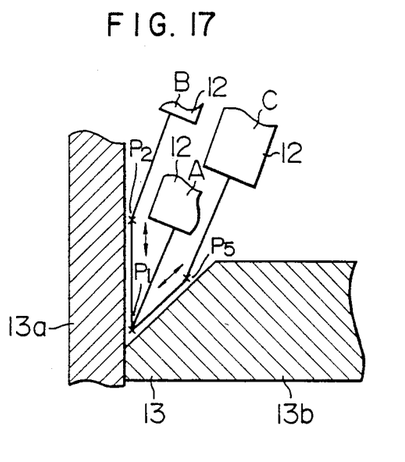

FIG. 17 shows a groove partially cut off and two different plates different in thickness. In this case as well, each amplitude S to SR and S to SL can be selected independent of the tracing. Thus it is possible to obtain a sufficient weld.

Figure 18:
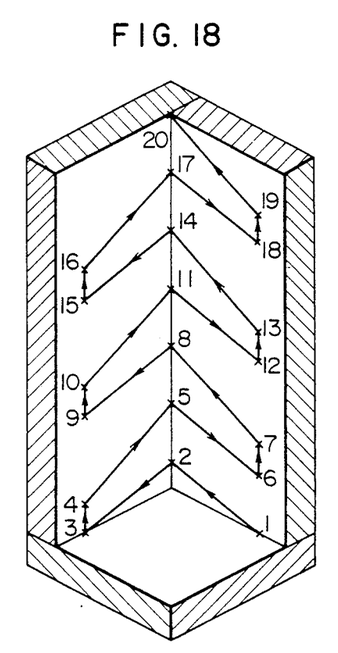

FIG. 18 shows one example of a rising up welding. In this case, with the conventional single oscillatory weaving, a melting fault is inevitably generated at a juncture portion. Moreover, the tracing itself has been very difficult for such welding using usual directions. However, according to the present embodiment, with the weaving pattern shown in FIG. 18, the melting fault at the juncture portion can be eliminated and in addition, the vectors $P_1$ and $P_2$ in this method are common vectors, so that the above usual direction tracing can also be effectively performed. In addition, even when welding a circular portion and employing arcuate interpolation, so long as the amplitude direction of weaving is correctly changed, the invention can also be applied thereto because the correction vectors $P_1$ and $P_2$ are calculated for every weaving period.

Although the weaving in the present embodiment has been extended over two planes, weaving extending over n planes may in general be applied. In this case, the correction unit vectors $P_1$, $P_2$, $P_3$, ..., $P_n$ corresponding to the respective n planes are decided, and the reference values $R_1$, $R_2$, ..., $R_n$ corresponding to extensions in each plane are decided. Thus, the correction vector to effect a tracing can be decided from:

$$D = \sum_{i=1}^{n} G \cdot (I_i - R_i) P_i$$

Further in the above embodiment, the correction vectors $D_1$ and $D_2$ have been decided as directed perpendicularly to the swing vectors $W_1$ and $W_2$ which have been utilized as a basis for determination of the direction of the vectors $D_1$ and $D_2$, however the direction may be parallel to the swing vectors $W_1$ and $W_2$. Moreover, the direction of the correction vectors $D_1$ and $D_2$ may be decided based upon the swing vector is not detected at the side not detecting the correction amount of the vector. This means for example that the direction of the correction vector $D_1$ is determined on the basis of the swing vector $W_2$ to hold a perpendicular or parallel relation thereto, while the direction of the correction vector $D_2$ is determined on the basis of the swing vector $W_1$ to hold a perpendicular or parallel relation thereto. Further, the correction vectors $D_1$ and $D_2$ have been described in the foregoing as having a perpendicular or parallel relation to the swing vectors $W_1$ and $W_2$, however, it is not particularly limited thereto, but any angle may be used. In the embodiment, if the angle between the swing vectors $W_1$ and $W_2$ is 0 or 180 degrees, this case has been dealt as a malfunction. However, it is noted that the description in this connection has been made only for convenience of explanation. For example, as mentioned above, in determining the direction of the correction vectors $D_1$ and $D_2$, if they are directed in parallel relation to other vectors, then even in these conditions, a tracing control may be realized. Still further, in the case that the correction vectors $D_1$ and $D_2$ are determined on the basis of the swing vectors $W_1$ and $W_2$, under some conditions there arise instances where a reversal in of the direction of the correction vectors $D_1$ and $D_2$ or the geometrical process is required to some extent. This however may readily be carried out by those skilled in the art, and the description therefor is omitted. In summary of the present invention, it is important to decide the direction of the correction vector based upon the swing vector, and it should be understood that the angle of the swing vector, or addition or deletion of more or less of the calculation process, and so on are not at all intended to limit the present invention.

Also, in the above embodiment, although the work with a weld line has been fixed and in contrast with this the welding torch has been moved in the foregoing description, it is obvious that a relative situation may also be possible wherein the welding torch is fixed and the work is moved.

As seen from the above description, since the present invention pays attention to the swing vector which is used for giving a relative weaving movement to the welding torch relative to a weld line and decides the direction of the correction amount on the basis of the swing vector, the direction of correction can be definitely determined and the actual information on position of the welding torch can be dispensed with, thereby enabling a correction of a tracing control in a short time. Thus, it makes possible to apply a tracing control to an industrial robot having more than one shafts.

What is claimed is:

1. A methd of controlling a weld line tracing, comprising: composing a weld main path vector for relative movement of a welding torch along said weld line, a swing vector for swing movement of said welding torch relative to said weld line, and a correction vector formed by calculating the amount of correction of said correction vector based upon the deviation between a present reference amount and a detected amount of an electrical parameter of an arc of said welding torch and by determining the direction of said correction vector independently of information on the actual position of the welding torch on the basis of said swing vector, and controlling said welding torch based upon the composed vector to effect tracing of said welding torch along said weld line.

2. A method of controlling a weld line tracing as set forth in claim 1, wherein said swing vector comprises a plurality of vectors, and said correction vector comprises a plurality of correction vectors respectively determined by each of said plurality of swing vectors.

3. The method of claim 2, wherein said swing vectors are formed in corresponding pairs on different sides of said weld main path vector, further comprised of determining the directions of said correction vectors to provide predetermined angular orientations between corresponding pairs of said swing vectors and said correction vectors.

4. A method of controlling a weld line tracing as set forth in claim 1, wherein said swing vector comprises a pair of swing vectors whose directions are respectively directed to each side of said weld main path vector, and said correction vector comprises a pair of correction vectors which are respectively perpendicular to each of said pair of swing vectors.

5. A method of controlling a weld line tracing as set forth in claim 1, wherein said swing vector comprises a pair of swing vectors whose directions are respectively directed to each side of said weld main path vector, and said correction vector comprises a pair of correction vectors which are respectively parallel to each of said pair of swing vectors.

6. The method of claim 1, further comprises of determining the direction of said correction vector to provide a predetermined angular orientation between said swing vector and said correction vector.

7. The method of claim 1, wherein said swing vector comprises a pair of swing vectors having directions oriented towards different sides of said weld main path vector, further comprised of forming said correction vector as a pair of correction vectors each having a predetermined angular orientation with a corresponding one of said swing vectors.

8. The method of claim 1, wherein said swing vector comprises a pair of swing vectors having directions extending from different sides of said weld main path vector, and defining a common plane, further comprised of forming said correction vector as a pair of correction vectors and determining the direction of each of said correction vectors to lie in said common plane.

9. The method of claim 1, wherein said swing vector is comprised of a pair of swing vectors having directions oriented toward different sides of said weld main path vector, further comprising:
    forming said correction vector as a pair of correction vectors each having a predetermined angular orientation with a corresponding one of said swing vectors;
    determining the magnitude of each of said corresponding vectors on the basis of the deviation between a reference amount and a detected amount of an electrical parameter of an arc of said welding torch occuring along the respective one of said corresponding swing vectors; and
    determining the direction of each of said correction vectors independently of information on the actual position of the welding torch to provide a predetermined angular orientation between each of said correction vectors and the other one of said corresponding swing vectors.

10. A method for tracing a weld line, comprising:
    moving a mechanism for giving a relative movement to a welding torch along a desired path;
    storing predetermined weld main path vector information for giving relative movement to said welding torch along said weld line and predetermined swing vector information for giving swing movement to said welding torch;
    detecting the amount of an electrical parameter of an arc of said welding torch;

calculating a correction amount for a correction vector based upon a deviation between said detected amount and a preset reference amount;

generating information on said correction vector formed by said correction amount and by a direction of said correction vector determined independently of information on the actual position of the welding torch on the basis of said swing vector information; and controlling said mechanism so as to move said welding torch along said weld line, in accordance with information composed of said weld main path vector information, said swing vector information and said correction vector information.

11. The method of claim 10, wherein said swing vector comprises a plurality of vectors, and said correction vector comprises a plurality of correction vectors respectively determined by each of said plurality of swing vectors.

12. The method of claim 11, wherein said swing vectors are formed in corresponding pairs on different sides of said weld main path vector, further comprised of determining the directions of said correction vectors to provide predetermined angular orientations between corresponding pairs of said swing vectors and said correction vectors.

13. The method of claim 10, wherein said swing vector comprises a pair of swing vectors whose directions are respectively directed to each side of said weld main path vector, and said correction vector comprises a pair of correction vectors which are respectively perpendicular to each of said pair of swing vectors.

14. The method of claim 10, wherein said swing vector comprises a pair of swing vectors whose directions are respectively directed to each side of said weld main path vector, and said correction vector comprises a pair of correction vectors which are respectively parallel to each of said pair of swing vectors.

15. The method of claim 10, further comprises of determining the direction of said correction vector to provide a predetermined angular orientation between said swing vector and said correction vector.

16. The method of claim 10, wherein said swing vector comprises a pair of swing vectors having directions oriented towards different sides of said weld main path vector, further comprised of forming said correction vector as a pair of correction vectors each having a predetermined angular orientation with a corresponding one of said swing vectors.

17. The method of claim 10, wherein said swing vector comprises a pair of swing vectors having directions extending from different sides of said weld main path vector, and defining a common plane, further comprised of forming said correction vector as a pair of correction vectors and determining the direction of each of said correction vectors to lie in said common plane.

18. The method of claim 10, wherein said swing vector is comprised of a pair of swing vectors having directions oriented toward different sides of said weld main path vector, further comprising:

forming said correction vector as a pair of correction vectors each having a predetermined angular orientation with a corresponding one of said swing vectors;

determining the magnitude of each of said corresponding vectors on the basis of the deviation between a reference amount and a detected amount of an electrical parameter of an arc of said welding torch occuring along the respective one of said corresponding swing vectors; and determining the direction of each of said correction vectors independently of information on the actual position of the welding torch to provide a predetermined angular orientation between each of said correction vectors and the other one of said corresponding swing vectors.

* * * * *